US010137440B2

(12) United States Patent
Moon et al.

(10) Patent No.: US 10,137,440 B2
(45) Date of Patent: Nov. 27, 2018

(54) CORE-SHELL COBALT CATALYSTS FOR FISCHER-TROPSCH SYNTHESIS REACTION AND PREPARING METHOD THEREOF

(71) Applicant: KOREA INSTITUTE OF SCIENCE AND TECHNOLOGY, Seoul (KR)

(72) Inventors: Dong Ju Moon, Seoul (KR); Jae Sun Jung, Seoul (KR); Jae Suk Lee, Seoul (KR); Gi Hoon Hong, Seoul (KR); Eun Hyeok Yang, Seoul (KR); Sung Soo Lim, Seoul (KR); Young Su Noh, Seoul (KR); Kwang Hyeok Lee, Seoul (KR); Sang Yong Lee, Seoul (KR); Na Young Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 269 days.

(21) Appl. No.: 14/983,849

(22) Filed: Dec. 30, 2015

(65) Prior Publication Data
US 2017/0028388 A1 Feb. 2, 2017

(30) Foreign Application Priority Data
Jul. 29, 2015 (KR) ........................ 10-2015-0107101

(51) Int. Cl.
*B01J 29/46* (2006.01)
*B01J 35/02* (2006.01)
*B01J 35/10* (2006.01)
*B01J 29/40* (2006.01)
*B01J 23/75* (2006.01)
*B01J 35/00* (2006.01)
*B01J 29/072* (2006.01)

(52) U.S. Cl.
CPC ............. *B01J 29/46* (2013.01); *B01J 29/072* (2013.01); *B01J 35/0086* (2013.01); *B01J 35/109* (2013.01); *B01J 35/1057* (2013.01); *B01J 35/1061* (2013.01); *B01J 23/75* (2013.01)

(58) Field of Classification Search
CPC ............. B01J 23/75; B01J 29/40; B01J 29/46
See application file for complete search history.

(56) References Cited

U.S. PATENT DOCUMENTS

| | | | |
|---|---|---|---|
| 4,764,498 A * | 8/1988 | Wissner ................... | B01J 21/08 502/232 |
| 8,802,741 B1 | 8/2014 | Jothimurugesan et al. | |
| 2003/0185721 A1* | 10/2003 | Wang .................... | B01J 8/0285 422/177 |

OTHER PUBLICATIONS

Zhang ( Fischer-Tropsch Catalysts for the production of Hydrocarbon fuels with high selectivity, ChemSusChem 7: p. 1251-1264) (Year: 2014).*

(Continued)

*Primary Examiner* — Jun Li
(74) *Attorney, Agent, or Firm* — Ladas & Parry LLP; Loren K. Thompson

(57) ABSTRACT

The present invention relates to a core-shell cobalt catalyst used for a Fischer-Tropsch synthesis reaction and a method for preparing the same. More particularly, it relates to a cobalt catalyst, which has a core-shell structure including a cobalt-supported and sintered alumina particle as a core and a zeolite powder coated on the surface of the alumina particle to a thickness of 50 μm or greater through mechanical alloying as a shell and is used to prepare hydrocarbons with high octane numbers through a Fischer-Tropsch synthesis reaction, and a method for preparing the same.

14 Claims, 5 Drawing Sheets

(56) References Cited

OTHER PUBLICATIONS

Heigl, Anal. Chem. 2008, 80: 8493-8500.*
Zadravkov et al, Central European Journal of Chemistry 5 (2) 2007, p. 385-395.*
Jingjiang He, et al; "Multiple Functional Capsule Catalysts: A Tailor-Made Confined Reaction Environment for the Direct Synthesis of Middle Isoperaffins from Syngas". Chemistry Eur. J.: Nov. 6, 2006; 12(32): 8296-304.
Xingang Li, et al; "One-step synthesis of H-β zeolite-enwrapped $Co/Al_2O_3$ Fischer-Tropsch catalyst with high spatial selectivity", Journal of Catalysis 265:26-34; Available online May 12, 2009.
Guohui Yang, et al. "Preparation, characterization and reaction performance of H-ZSM-5/cobalt/silica capsule catalysts with different sizes for direct synthesis of isoparaffins", Applied Catalysis A: General 329, pp. 99-105; Available online Jun. 29, 2007.

\* cited by examiner

CORE-SHELL COBALT CATALYSTS FOR FISCHER-TROPSCH SYNTHESIS REACTION AND PREPARING METHOD THEREOF

CROSS-REFERENCE TO RELATED APPLICATIONS

This application claims, under 35 U.S.C. § 119, the priority of Korean Patent Application No. 10-2015-0107101, filed on Jul. 29, 2015, in the Korean Intellectual Property Office, the disclosure of which is incorporated herein by reference in its entirety.

BACKGROUND (a) Technical Field

The present invention relates to a core-shell cobalt catalyst used for a Fischer-Tropsch synthesis reaction and a method for preparing the same. More particularly, it relates to a cobalt catalyst, which has a core-shell structure including a cobalt-supported and sintered alumina particle as a core and a zeolite powder coated on the surface of the alumina particle to a thickness of 50 µm or greater through mechanical alloying as a shell and is used to prepare hydrocarbons with high octane numbers through a Fischer-Tropsch synthesis reaction, and a method for preparing the same.

(b) Background Art

Fischer-Tropsch (FT) synthesis reaction is a critical process of preparing hydrocarbon compounds from a synthesis gas in gas to liquids (GTL) technology.

In the FT synthesis reaction, long chain n-paraffins are prepared from a synthesis gas (a mixture of $H_2$ and CO gases) through a chain growth reaction. Through the FT synthesis reaction, paraffin-based saturated hydrocarbons with high cetane numbers such as diesel, jet fuel, waxes, etc. are prepared mostly as synthetic fuels. Therefore, an upgrading process is performed to convert them into hydrocarbons with high octane numbers, which are more economical and applied to more areas. That is to say, the synthetic fuels prepared through the FT synthesis reactions are converted to lower aliphatic unsaturated hydrocarbons (light olefins) or isoparaffins through additional upgrading processes such as hydrocracking, isomerization, etc.

Recently, research is underway to develop catalysts for synthesizing specific hydrocarbon compounds directly from the FT synthesis reaction.

U.S. Pat. No. 8,802,741 (patent document 1) discloses preparation of liquid hydrocarbons using a hybrid catalyst obtained by physically mixing a cobalt catalyst component and an acidic zeolite (ZSM-48) component.

*Journal of Catalysis* 265 (2009), 26-34 (non-patent document 1) discloses a core-shell cobalt catalyst for an FT synthesis reaction of preparing isoparaffins directly from a synthesis gas. Specifically, in the non-patent document 1, a cobalt catalyst having a core-shell structure of [H-β][Co/$Al_2O_3$] is prepared by using a cobalt-supported alumina pellet as a core and coating H-β zeolite on the surface of the core to a thickness of 16-36 µm by adding the core to a zeolite precursor solution and conducting hydrothermal synthesis. The non-patent document 1 describes that the core-shell cobalt catalyst exhibits a remarkably improved isoparaffin/n-paraffin molar ratio ($C_{iso}/C_{normal}$) as compared to a hybrid catalyst prepared by physically mixing cobalt-supported alumina and H-β zeolite.

*Langmuir* 21 (2005), 1699-1702 (non-patent document 2) discloses a core-shell cobalt catalyst for an FT synthesis reaction of preparing $C_{10}$ or lower middle isoparaffins from a synthesis gas. Specifically, a cobalt catalyst having a core-shell structure of [ZSM-5][Co/$SiO_2$] is prepared by using cobalt-infiltrated silica as a core and coating ZSM-5 on the surface of the core to a thickness of up to 23.1 µm by adding the core to a zeolite precursor solution and conducting hydrothermal synthesis.

The core-shell cobalt catalysts used for FT synthesis reactions disclosed in the non-patent documents 1 and 2 are prepared by using cobalt-supported alumina or silica as a core and coating zeolite on the outer surface of the core through hydrothermal synthesis. During the hydrothermal synthesis, Si (core)-O—Al (shell) or Al (core)-O—Si (shell) bonding is induced as a sol containing the zeolite precursor reacts with the core and a core-shell structure is formed as a result thereof. The hydrothermal synthesis reaction is performed for a long time of about 7 days at a rotational speed of 10 rpm or lower in order to reduce breakage of the core particle and hardening of the sol. As a result, a shell having a maximum thickness of 36 µm is formed. That is to say, it is impossible to coat a shell to a thickness greater than 36 µm using the hydrothermal synthesis methods disclosed in the non-patent documents 1 and 2.

Through long research experiences, the inventors of the present invention have found out that, when designing a catalyst used for an FT synthesis reaction, the distribution and reducibility of active metal affect the conversion rate of a synthesis gas or the selectivity of a hydrocarbon. Especially, they have realized that, for a cobalt catalyst for FT synthesis which is able to increase the selectivity of hydrocarbons with high octane numbers, uniform distribution of the active metal cobalt and prevention of its reduction are of great importance. In addition, they have found out that spatial restriction is important in synthesis of hydrocarbons with high octane numbers directly from a synthesis gas because hydrocracking and isomerization should occur together with the FT synthesis. That is to say, after the FT synthesis reaction has occurred at the cobalt active metal, if the product is desorbed rather than being adsorbed on the acid site of zeolite, specific hydrocarbon compounds cannot be prepared because hydrocracking and isomerization cannot occur. The sol-gel method or hydrothermal synthesis method presented by the non-patent documents 1 and 2 is limited in synthesis of hydrocarbons with high octane numbers directly from a synthesis gas due to spatial restriction because the coating thickness is small with up to 36 µm.

The inventors of the present invention have attempted to solve the spatial restriction problem by inducing uniform dispersion of cobalt active metal by infiltrating it into a mesoporous alumina support and forming a shell on the outer surface of the active metal-supported alumina by coating a microporous zeolite having many acid sites to a thickness as large as possible. As a result, they have completed the present invention by developing a core-shell cobalt catalyst having a shell thickness of 50 µm or greater by introducing a mechanical alloying process used in the field of powder metallurgy.

REFERENCES OF THE RELATED ART

Patent Document (Patent document 1) U.S. Pat. No. 8,802,741, "Hybrid Fischer-Tropsch catalysts and process for use".

Non-Patent Documents (Non-patent document 1) *Journal of Catalysis* 265 (2009), 26-34, "One-step synthesis of H-β zeolite-enwrapped Co/Al2O3 Fischer-Tropsch catalyst with high spatial selectivity".

(Non-patent document 2) *Langmuir* 21 (2005), 1699-1702, "Multiple-Functional Capsule Catalysts: A Tailor-Made Confined Reaction Environment for the Direct Synthesis of Middle Isoparaffins from Syngas".

SUMMARY

The present invention is directed to providing a core-shell cobalt catalyst for an FT synthesis reaction, which can increase the selectivity of hydrocarbons with high octane numbers from a synthesis gas.

The present invention is also directed to providing a method for preparing a core-shell cobalt catalyst for an FT synthesis reaction, by ball milling an mesoporous alumina particle having cobalt uniformly dispersed therein as a core together with zeolite by a mechanical alloying process, thereby forming a microporous shell coated with a 50 μm or greater thickness of zeolite powder on the surface of the core.

The present invention is also directed to providing a method for preparing hydrocarbons with high octane numbers from a synthesis gas using the core-shell cobalt catalyst.

In an aspect, the present invention provides a core-shell cobalt catalyst for a Fischer-Tropsch synthesis reaction, which includes a spherical, cobalt-supported and sintered alumina particle having a diameter of 1-5 mm as a core and a zeolite powder having a $SiO_2/Al_2O_3$ molar ratio of 5-40 coated on the surface of the core to a thickness of 50-300 μm through a mechanical alloying process as a shell.

In an exemplary embodiment of the present invention, the catalyst of the present invention may have a bimodal porous structure with the core having mesopores with an average pore size of 10.5-21.1 nm and the shell having micropores with an average pore size of 0.6-0.82 nm.

In an exemplary embodiment of the present invention, the alumina particle constituting the core may be an α- or γ-alumina particle.

In an exemplary embodiment of the present invention, the zeolite powder coated through the mechanical alloying process to form the shell may be ZSM-5 zeolite.

In another aspect, the present invention provides a method for preparing a core-shell cobalt catalyst for a Fischer-Tropsch synthesis reaction, which includes:

a) a step of preparing spherical alumina particle support having a diameter of 1-5 mm;

b) a step of preparing a cobalt-supported alumina core by infiltrating cobalt into the alumina support and sintering at 300-500° C.;

c) a step of preparing a core-shell cobalt catalyst having a zeolite powder coated on the surface of the alumina core to a thickness of 50-300 μm as a shell by mechanically alloying the cobalt-supported alumina core and a zeolite powder having a $SiO_2/Al_2O_3$ molar ratio of 5-40; and d) a step of sintering the core-shell cobalt catalyst at 300-500° C.

In an exemplary embodiment of the present invention, a volume ratio of the alumina core and the zeolite powder may be maintained at 1:0.5-1:2.0.

In an exemplary embodiment of the present invention, the mechanical alloying may be performed at 100-400 rpm for 6-40 hours after loading the raw material particles and a milling ball at a weight ratio of 1:2-1:10.

In another aspect, the present invention provides a method for preparing a hydrocarbon compound by conducting Fischer-Tropsch synthesis reaction of a synthesis gas using the core-shell cobalt catalyst.

The cobalt catalyst of the present invention has a core-shell structure wherein a zeolite powder is thickly coated on the surface of a cobalt-supported alumina particle core to a thickness of 50 μm or greater, thereby forming a shell. In the existing art where the zeolite shell is formed by a sol-gel method or a hydrothermal synthesis method, the coating thickness cannot exceed 36 μm even with a long time of about 7 days. However, in the present invention, coating to a thickness of up to 300 μm can be easily achieved by introducing the mechanical alloying process.

The cobalt catalyst of the present invention has a bimodal porous structure with different pore size distributions suitable for the roles of a core and a shell. That is to say, it is designed such that the core has mesopores with an average pore size of 10.5-21.1 nm so as to induce uniform dispersion of the active metal as a support for supporting the cobalt active metal whereas the shell is formed by coating an acidic zeolite having micropores with an average pore size of 0.6-0.82 nm so as to prevent reduction of the cobalt active metal.

Accordingly, the cobalt catalyst of the present invention enables preparation of hydrocarbons with high octane numbers with high $C_2$-$C_4$ light olefin selectivity from $C_2$-$C_4$ products and high olefin and isoparaffin selectivity from total hydrocarbon products through Fischer-Tropsch synthesis reactions. Specifically, when the cobalt catalyst of the present invention is used for a Fischer-Tropsch synthesis reaction, $C_2$-$C_4$ light olefin selectivity from $C_2$-$C_4$ products can be increased up to 60.31%, olefin selectivity from $C_2$+ products can be increased up to 0.467 and isoparaffin selectivity from $C_3$+ products can be increased up to 4.8490.

DETAILED DESCRIPTION

Figure 1:
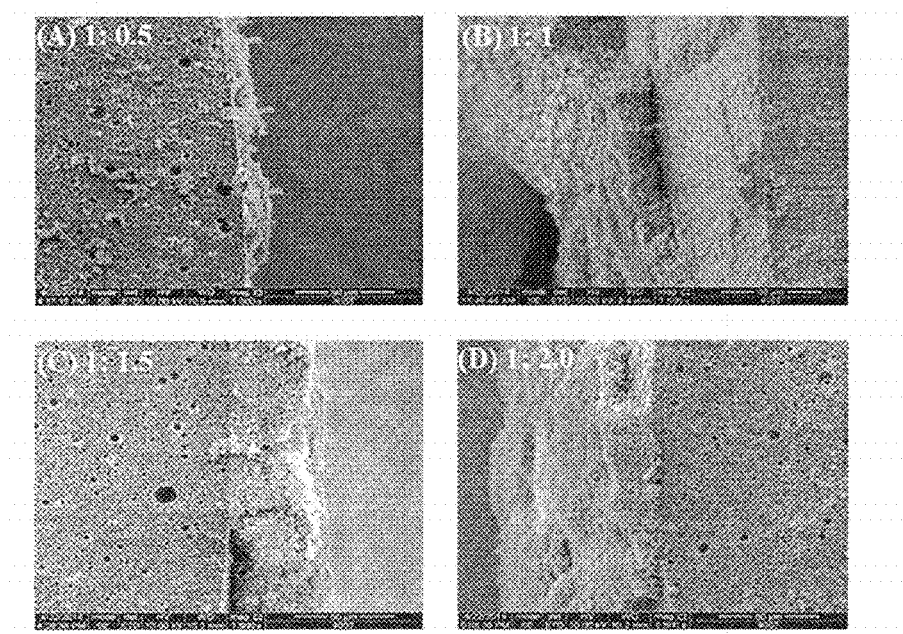
FIG. 1 shows cross-sectional electron microscopic images of core-shell cobalt catalysts prepared by mechanical alloying with different volume ratios of an alumina particle to a ZSM-5 zeolite powder at 1:0.5 (A), 1:1.0 (B), 1:1.5 (C) and 1:2.0 (D).

The present invention provides a core-shell cobalt catalyst used in a Fischer-Tropsch synthesis reaction of preparing hydrocarbons from a synthesis gas. That is to say, the present invention provides a novel core-shell cobalt catalyst including a cobalt-supported and sintered alumina particle having a relatively large diameter as a core and a zeolite powder coated on the surface of the alumina particle to a thickness of 50 µm or greater through mechanical alloying as a shell.

The cobalt catalyst of the present invention has a bimodal porous structure with the core part and the shell part having different pore sizes. Due to this bimodal porous structure, it is possible to induce uniform dispersion of the active metal and inhibit reduction, thereby improving selectivity for hydrocarbons with high octane numbers.

In the cobalt catalyst of the present invention, the shell is formed by coating the zeolite powder on the surface of the alumina particle as the core to a thickness of 50 µm or greater through mechanical alloying. The thick shell provides enough space for an FT synthesis reaction as well as hydrocracking and isomerization.

The reaction mechanism whereby hydrocarbons are prepared from a synthesis gas using the cobalt catalyst of the present invention is as follows. First, long chain n-paraffins are produced at the cobalt active sites dispersed in the pores of the core by an FT synthesis reaction. The produced long chain n-paraffins are readsorbed at the zeolite acid sites as they diffuse into and pass through the zeolite channel of the shell. Then, hydrocarbons with high octane numbers and with controlled olefin and isoparaffin selectivities are prepared through hydrocracking and isomerization. The rate of reaction may be determined by the diffusion rate of the n-hydrocarbons passing through the zeolite channel. The larger the shell thickness, the slower the diffusion rate, and sufficient hydrocracking and isomerization are possible due to increased collision numbers with the zeolite acid sites, residence time, etc. Therefore, in order to synthesize hydrocarbons with high octane numbers from a synthesis gas, the shell where the hydrocracking and isomerization occur should be coated with a sufficient thickness. Because the core-shell cobalt catalyst presented by the present invention has a sufficiently thick shell, it can be used in an FT synthesis reaction to prepare hydrocarbons having increased contents of olefins and isoparaffins since the hydrocracking and isomerization can occur satisfactorily.

In the cobalt catalyst of the present invention, the core is composed of a spherical alumina particle having a diameter of 1-5 mm and has mesopores with an average pore size of 10.5-21.1 mm. When the size of the alumina particle constituting the core is smaller than 1 mm, catalytic activity may decrease due to increased pressure drop inside a reactor. And, when it exceeds 5 mm, the reaction rate of FT synthesis may decrease due to decreased diffusion rate during the catalytic reaction. Accordingly, it is desired that the alumina particle used as the support has a size within the above range. The mesopores of the alumina particle enable uniform supporting of the cobalt active metal. When the pore size is smaller than 10.5 nm, the reducibility of the catalyst may be inhibited because of decreased size of the supported active metal. And, when it exceeds 21.1 nm, the reaction rate of FT synthesis may decrease due to decreased dispersibility of the catalyst owing to increased size of the supported active metal. The alumina particle used as the support in the present invention may be phase-changed to γ- or α-phase through a pre-sintering process. Accordingly, α- or γ-alumina may be used as the alumina particle in the present invention. α-Alumina may be used as the core material if a thicker shell is desired to be formed.

The cobalt active metal is supported on the core. For example, the cobalt active metal may be supported by infiltration which is commonly used in the field of catalyst preparation. However, the present invention is not particularly limited in the catalyst supporting method. The cobalt active metal may be supported in an amount of 2-20 wt % based on the weight of the alumina support.

In the catalyst of the present invention, the shell is formed by coating an acidic zeolite having a $SiO_2/Al_2O_3$ molar ratio of 5-40 by mechanical alloying. The shell is coated relatively thickly with a thickness of 50 µm or greater, specifically 50-300 µm, more specifically 100-250 µm. When the thickness of the shell is smaller than 50 µm, the reduction of cobalt cannot be prevented effectively and it is impossible to ensure enough space for hydrocracking and isomerization. As a result, it is difficult to prepare hydrocarbons with high octane numbers. The reduction of cobalt can be prevented easily as the shell has a larger thickness. However, in consideration of workability, etc. the shell thickness may be up to 300 µm. The shell formed by coating the zeolite powder by mechanical alloying has micropores with an average pore size of 0.6-0.82 nm. When the average pore size of the shell is smaller than 0.6 nm, the long chain paraffins produced at the core cannot diffuse to the shell easily, resulting in a slow rate of diffusion. And, when it exceeds 0.82 nm, the intrinsic structural selectivity of the zeolite may decrease.

The present invention also provides a method for preparing the core-shell cobalt catalyst.

The method for preparing the catalyst according to the present invention includes:

a) a step of preparing spherical alumina particle support having a diameter of 1-5 mm;

b) a step of preparing a cobalt-supported alumina core by infiltrating cobalt into the alumina support and sintering at 300-500° C.;

c) a step of preparing a core-shell cobalt catalyst having a zeolite powder coated on the surface of the alumina core to a thickness of 50-300 µm as a shell by mechanically alloying the cobalt-supported alumina core and a zeolite powder having a $SiO_2/Al_2O_3$ molar ratio of 5-40; and d) a step of sintering the core-shell cobalt catalyst at 300-500° C.

Hereinafter, each step of the method for preparing the catalyst according to the present invention is described in detail.

First, in the step a), a mesoporous alumina particle having a diameter of 1-5 mm and an average pore size of 10.5-21.1 nm is prepared. The alumina particle may be α- or γ-alumina. The phase structure of alumina is determined by pre-sintering temperature. When the sintering temperature is around 500° C., γ-alumina is produced predominantly. And, when the sintering temperature is raised to 1000° C., phase change occurs from γ-alumina to α-alumina. Specific surface area, pore size and pore volume vary more or less depending on the phase of alumina. α-Alumina may be used if a thicker shell is desired to be formed.

In the step b), a cobalt-supported alumina core is prepared. Specifically, the alumina core is prepared by supporting cobalt active metal on the alumina particle prepared in the step a) as a support according to a commonly employed supporting method and then sintering at 300-500° C. In an exemplary embodiment of the present invention, cobalt may be supported by a slurry infiltration method. However, the supporting method is not limited to the infiltration method in the present invention. The supporting amount of the cobalt active metal may be 2-20 wt %, specifically 5-10 wt %, based on the weight of the alumina support. After the cobalt active metal is supported, the alumina core is prepared by drying and sintering in an electric furnace at 300-500° C. for about 3-10 hours. The sintering may be performed under an air atmosphere.

In the step c), a core-shell cobalt catalyst is prepared by coating a zeolite powder on the surface of the alumina core. The coating is performed by mechanical alloying.

The 'mechanical alloying (MA)' process performed in the present invention is an alloying technique used in the field of powder metallurgy, whereby an alloy powder is obtained by stirring or ball milling elemental powders of the alloy or a pre-alloyed powder with high mechanical energy. The mechanical alloying process is advantageous in that even the elements that are not readily alloyed can be alloyed because all reactions occur in solid state with mechanical energy without the need of applying heat or adding a solvent to melt the metals. In the present invention, as high energy is applied to the raw material particles consisting of the cobalt-supported alumina particle and the zeolite powder to be mechanically alloyed through high-speed rotation, the raw material particles are ground to a fine powder and reactivity is increased as the dispersibility of the raw material particles is increased. As a result, the zeolite powder is coated on the surface of the alumina particle.

In the mechanical alloying process, ball weight, milling speed, milling time, etc. are important parameters affected by the properties of powders to be alloyed. In the present invention, the raw material particles, i.e., the alumina core and the zeolite powder, are mechanically alloyed. A volume ratio of the alumina core to the zeolite powder used as the raw material particles is maintained at 1:0.5-1:2.0, specifically at 1:1.0-1:2.0. When the volume ratio of the zeolite powder to the alumina core is smaller than 1:0.5, it is impossible to form a desired thick shell. And, when it exceeds 1:2.0, severe delamination of the raw material particles may occur.

For mechanical alloying of the raw material particles, the raw material particles and a milling ball are loaded in a container at a weight ratio of 1:2-1:10 and ball milling is performed at 100-400 rpm for 6-40 hours. When the weight ratio of the raw material particles to milling ball is smaller than 1:2, mechanical alloying may not occur and only the grinding of the raw material particles may occur. And, when it exceeds 1:10, mechanical alloying may not occur due to decreased dispersibility of the raw material particles. When the rotational speed of a ball mill is lower than 100 rpm, mechanical alloying may not occur. And, when it exceeds 400 rpm, the alumina core particles may be broken as they collide with one another. It is not easy to quantitatively specify ball milling time because it varies greatly depending on a milling method, rotational speed, loading percentage, etc. Therefore, the time when the mechanical alloying process is completed may be determined based on change in the size and microstructure of the powder. If necessary, the processing time may be specified as 6-40 hours. In general, when the processing time is too short, the coating surface may become nonuniform due to severe islanding of the ground fine powder. And, when the processing time is too long, the coating may peel off as the ground fine powder recombines. The catalyst prepared through the mechanical alloying process has a core-shell structure in which the zeolite powder is thickly coated with a thickness of 50 μm or greater on the surface of the alumina core.

In the step d), the core-shell cobalt catalyst is sintered. In the present invention, sintering is performed twice. The first sintering is performed after cobalt has been supported on the alumina support, and the second sintering is performed after the coating through the mechanical alloying process. The core-shell cobalt catalyst is sintered at 300-500° C. When the sintering temperature is lower than 300° C., acid sites may decrease because conversion to HY zeolite is difficult. And, when it is higher than 500° C., the dispersibility of the active metal may decrease due to the size of the particles increased by further sintering of cobalt oxide distributed in the core part as the active metal. The sintering may be performed under an air atmosphere.

The present invention also provides a method for preparing a hydrocarbon compound by conducting FT synthesis reaction using the core-shell cobalt catalyst.

The FT synthesis reaction is performed using a synthesis gas ($CO/H_2$ molar ratio=2) as a raw material under the condition of reaction temperature 200-400° C., reaction pressure 10-30 atm and space velocity 1,000-3,000 $h^{-1}$. The hydrocarbon products obtained from the above performance have higher $C_2$-$C_4$ light olefin selectivity from $C_2$-$C_4$ products, olefin selectivity from $C_2$+ products and isoparaffin selectivity from $C_3$+ product as compared to the existing FT synthesis reaction. This indicates that hydrocracking and isomerization occur in the FT synthesis reaction using the cobalt catalyst of the present invention.

EXAMPLES

The present invention will be described in more detail through preparation examples and examples. However, the present invention is not limited by them.

[Preparation Examples] Preparation of Cobalt Catalyst

Preparation Example 1. Preparation of Core-Shell Cobalt Catalyst by Mechanical Alloying (1) Preparation of Spherical γ- or α-Alumina Support A commercially available spherical alumina support having a diameter of 2.5 mm (Sasol, South Africa) was prepared. A γ-alumina support was prepared by sintering the alumina support at 500° C. Also, an α-alumina support was prepared by sintering the alumina support at 1,000° C.

The γ-alumina support was denoted as type 'A' and the α-alumina support was denoted as type 'B'.

(2) Preparation of Cobalt-Supported Alumina Core

An aqueous cobalt solution was prepared using 10 wt % of cobalt nitrate ($Co(NO_3)_2 \cdot 6H_2O$, 98.0%, Junsei Chem., Japan) based on the weight of the alumina support. After immersing the alumina support in the aqueous cobalt solution, cobalt was infiltrated by a slurry infiltration method using a rotary evaporator. The cobalt-infiltrated alumina particle was dried at 80° C. for 24 hours and then sintered at 400° C. for 5 hours.

The alumina core (density=0.712 g/mL) prepared by supporting cobalt on the type A alumina support was denoted as '10Co(A)' and the alumina core (density=0.961 g/mL) prepared by supporting cobalt on the type B alumina support was denoted as '10Co(B)'.

(3) Preparation of Core-Shell Cobalt Catalyst by Mechanical Alloying

The cobalt-supported alumina core was coated with ZSM-5 zeolite ($SiO_2/Al_2O_3$=38, average particle size=2 μm, density=0.216 g/mL; Sam-Chun, Korea) by mechanical alloying using a horizontal ball mill (Universal Ball-Mill, Intech Co, Korea).

Specifically, after loading raw material particles, i.e., the alumina core and the ZSM-5 zeolite, in a 250-mL plastic ball mill container at a volume ratio of 1:1.5, mechanical alloying was performed at 200 rpm for 12 hours using a horizontal ball mill. For the type A, a weight ratio of the raw material particles and the milling ball was maintained at 1:2.19. For the type B, the weight ratio of the raw material particles and the milling ball was maintained at 1:2.96. A core-shell cobalt catalyst prepared through the mechanical alloying was sintered at 400° C. for 8 hours under an air atmosphere.

The core-shell cobalt catalyst prepared from the type A alumina support was denoted as '10Co(A-12H)' and the catalyst prepared from the type B alumina support was denoted as '10Co(B-12H)'.

Preparation Example 2. Preparation of Core-Shell Cobalt Catalyst by Mechanical Alloying A core-shell cobalt catalyst was prepared in the same manner as in Preparation Example 1, except that the mechanical alloying in (3) was performed for 24 hours.

The core-shell cobalt catalyst prepared from the type A alumina support was denoted as '10Co(A-24H)' and the catalyst prepared from the type B alumina support was denoted as '10Co(B-24H)'.

Preparation Example 3. Preparation of Core-Shell Cobalt Catalyst by Mechanical Alloying A core-shell cobalt catalyst was prepared in the same manner as in Preparation Example 1, except that the mechanical alloying in (3) was performed for 36 hours.

The core-shell cobalt catalyst prepared from the type A alumina support was denoted as '10Co(A-36H)' and the catalyst prepared from the type B alumina support was denoted as '10Co(B-36H)'.

The characteristics of the core-shell cobalt catalysts prepared in Preparation Examples 1-3 are summarized in Table 1 (type A catalysts) and Table 2 (type B catalysts).

TABLE 1

| | | ZSM-5 | $Al_2O_3$(A) | 10Co(A) | 10Co(A-12H) | 10Co(A-24H) | 10Co(A-36H) |
|---|---|---|---|---|---|---|---|
| Mesoporous core | Particle diameter (mm) | — | 2.5 | 2.5 | 2.5 | 2.5 | 2.5 |
| | Specific surface area[1] ($m^2/g$) | — | 226 | 176 | 164 | 163 | 163 |
| | Pore volume[1] ($cm^3/g$) | — | 0.50 | 0.38 | 0.37 | 0.37 | 0.37 |
| | Average pore size[2] (nm) | — | 11.5 | 10.5 | 10.5 | 10.5 | 10.5 |
| Microporous shell[2] | Average coating thickness[3] (μm) | — | — | — | 67 | 61 | 54 |
| | Specific surface area[1] ($m^2/g$) | 312 | — | — | 251 | 247 | 242 |
| | Pore volume[1] ($cm^3/g$) | 0.16 | — | — | 0.063 | 0.085 | 0.057 |
| | Average pore size[2] (nm) | 0.5 | — | — | 0.82 | 0.82 | 0.82 |
| Particle size[4] | $Co_3O_4$ | — | — | 12.8 | 12.7 | 12.4 | 11.3 |
| | CO | — | — | 9.6 | 9.5 | 9.3 | 8.5 |

[1]Measured by t-plot method.
[2]Measured by NLDFT method.
[3]Measured by SEM/EDS mapping.
[4]XRD analysis, d(CoO) = 3/4 d($Co_3O_4$).

TABLE 2

| | | ZSM-5 | $Al_2O_3$(B) | 10Co(B) | 10Co(B-12H) | 10Co(B-24H) | 10Co(B-36H) |
|---|---|---|---|---|---|---|---|
| Mesoporous core | Particle diameter (mm) | — | 2.5 | 2.5 | 2.5 | 2.5 | 2.5 |
| | Specific surface area[1] ($m^2/g$) | — | 60 | 54 | 49 | 52 | 47 |
| | Pore volume[1] ($cm^3/g$) | — | 0.23 | 0.20 | 0.18 | 0.19 | 0.19 |
| | Average pore size[2] (nm) | — | 19.4 | 19.4 | 19.5 | 21.1 | 18.0 |
| Microporous shell[2] | Average coating thickness[3] (μm) | — | — | — | 118 | 220 | 65 |
| | Specific surface area[1] ($m^2/g$) | 312 | — | — | 173 | 205 | 173 |
| | Pore volume[1] ($cm^3/g$) | 0.16 | — | — | 0.095 | 0.116 | 0.091 |
| | Average pore size[2] (nm) | 0.5 | — | — | 0.6 | 0.6 | 0.6 |

TABLE 2-continued

|  |  | ZSM-5 | Al$_2$O$_3$(B) | 10Co(B) | Core-shell cobalt catalysts | | |
|---|---|---|---|---|---|---|---|
|  |  |  |  |  | 10Co(B-12H) | 10Co(B-24H) | 10Co(B-36H) |
| Particle size[4] | Co$_3$O$_4$ | — | — | 15.2 | 14.5 | 14.7 | 11.0 |
|  | CO | — | — | 11.4 | 10.9 | 11.0 | 10.3 |

[1]Measured by t-plot method.
[2]Measured by NLDFT method.
[3]Measured by SEM/EDS mapping.
[4]XRD analysis, d(CoO) = 3/4 d(Co$_3$O$_4$).

From the nitrogen physisorption measurement result shown in Table 1 and Table 2, it can be seen that the core-shell catalyst prepared through the mechanical alloying maintains cobalt particles highly dispersed even after the formation of the shell. Also, it can be seen that the physical properties of the core-shell structure is maintained independently. Comparing the physical properties of the type A alumina particles and the type B alumina particles, which are used in the core part, with the physical properties of the core after the shell is formed on the surface of each alumina particle, the pore volume and average pore size are nearly constant although the specific surface area decreased slightly. Also, the intrinsic physical properties of the zeolite was maintained with the specific surface area of the shell being 173-251 m$^2$/g and the average pore size being 1 nm or smaller. Accordingly, it was confirmed that the core-shell catalyst presented in the present invention has a bimodal pore structure having mesopores and micropores at the same time, as can be clearly seen from FIGS. 4 and 5. As confirmed above, the catalyst of the present invention has the shell which maintains different physical properties from the core. Because the shell has a channel structure favorable for diffusion of long chain n-paraffins as well as acid sites, it enables hydrocracking and isomerization.

Reference Example. Preparation of Core-Shell Cobalt Catalyst by Mechanical Alloying A core-shell cobalt catalyst was prepared in the same manner as in Preparation Example 1. However, the mechanical alloying (3) was performed by loading the raw material particles, i.e., the alumina core and the ZSM-5 zeolite, in a 250-mL plastic ball mill container at volume ratios of 0.5, 1.0, 1.5 and 2.0. Also the mechanical alloying was performed at 200 rpm for 36 hours using a horizontal ball mill. The weight ratio of the raw material particles and the milling ball was maintained at 1:1.16-6.39.

Figure 2:
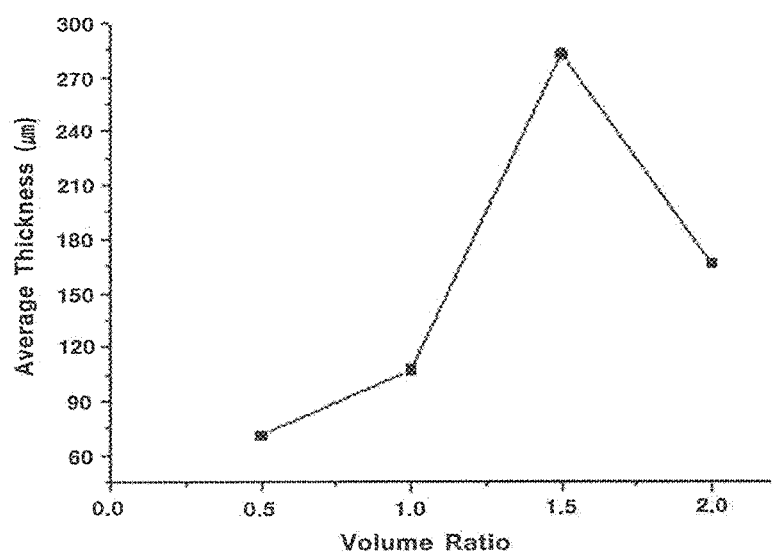
FIG. 2 shows the average coating thickness of core-shell cobalt catalysts prepared by mechanical alloying with different volume ratios of an alumina particle to a ZSM-5 zeolite powder at 1:0.5, 1:1.0, 1:1.5 and 1:2.0.

FIG. 1 shows cross-sectional electron microscopic images of the core-shell cobalt catalysts prepared in Reference Example by mechanical alloying with different volume ratios of the alumina particle and the ZSM-5 zeolite powder at 1:0.5 (A), 1:1.0 (B), 1:1.5 (C) and 1:2.0 (D). And, FIG. 2 shows the average coating thickness of core-shell cobalt catalysts prepared by mechanical alloying with different volume ratios of the alumina particle and the ZSM-5 zeolite powder. From FIG. 1 and FIG. 2, it can be seen that the coating thickness can be varied by the volume ratio of the raw material particles.

Figure 3:
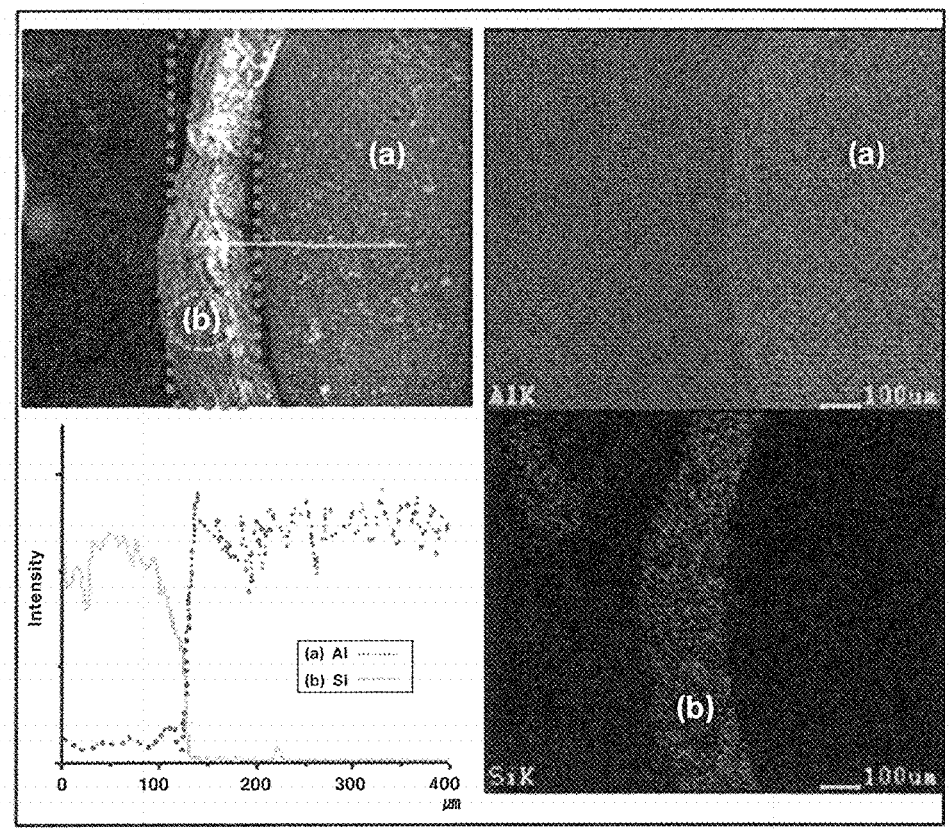
FIG. 3 shows a result of observing the internal structure of a core-shell cobalt catalyst 10Co(B-12H) prepared by mechanical alloying through electron microscopic images and mapping.

FIG. 3 shows a result of observing the internal structure of the 10Co(B-12H) catalyst prepared by mechanical alloying through electron microscopic images and mapping. From FIG. 3, it can be seen that the core-shell catalyst has a bimodal pore structure consisting of the core part having mesopores and the shell part having microporous. In FIG. 3, the Al signals shown in red color and the Si signals shown in green color represent the spherical alumina and the ZSM-5, respectively. From the finding that the Si signal around 118.1 μm is close to 0, it can be seen that the 10Co(B-12H) catalyst has an average shell thickness of about 118.1 μm. The shell thickness of each catalyst was measured in this manner and is given in Table 1.

Figure 4:
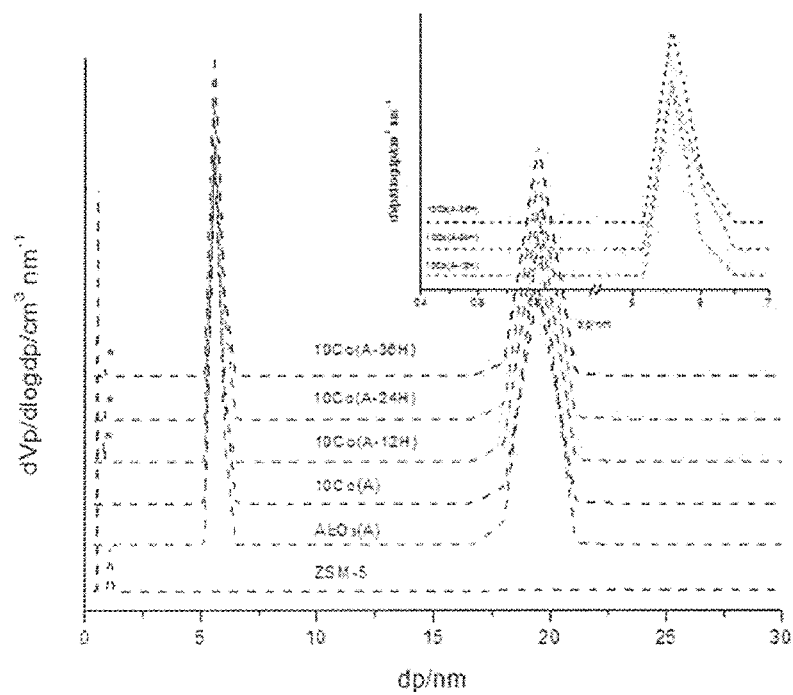
FIG. 4 shows the physical properties of a core-shell cobalt catalyst prepared by mechanical alloying predicted by the non-local density functional theory (NLDFT) method. In the mechanical alloying, γ-phase alumina support (type A support) was used.
Figure 5:
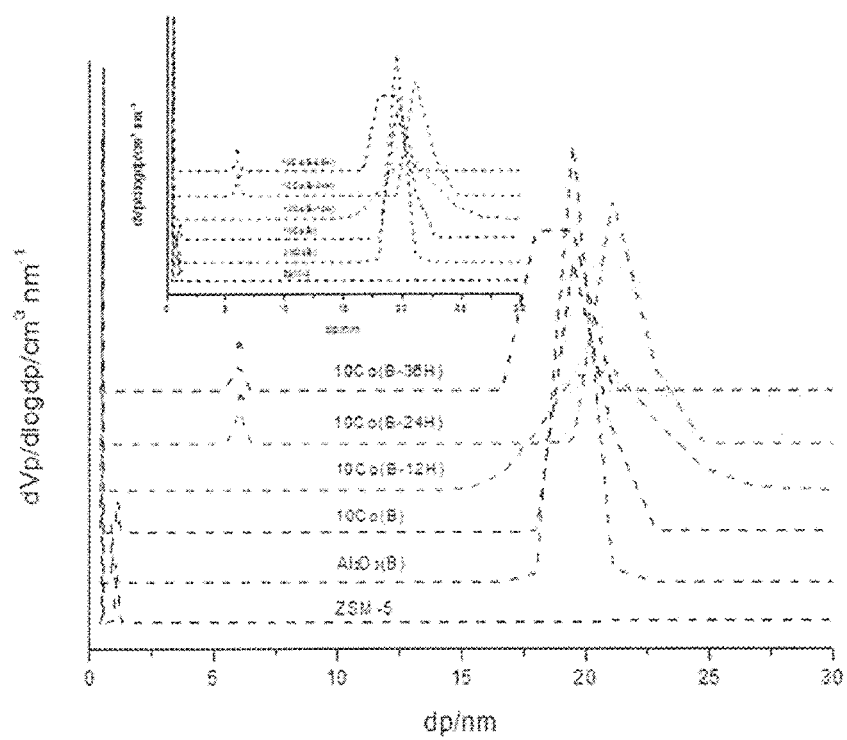
FIG. 5 shows the physical properties of a core-shell cobalt catalyst prepared by mechanical alloying predicted by the non-local density functional theory (NLDFT) method. In the mechanical alloying, α-phase alumina support (type B support) was used.

FIGS. 4 and 5 show the physical properties of the core-shell cobalt catalyst prepared by mechanical alloying predicted by the non-local density functional theory (NLDFT) method. In the mechanical alloying of FIGS. 4 and 5, γ-phase alumina support (type A support) or α-phase alumina support (type B support) was used. From FIGS. 4 and 5, it can be seen that the catalyst prepared by the method of the present invention has a bimodal pore structure having mesopores and micropores. It can also be seen that the signals observed in the micro-range of below 1 nm correspond to the shell thickness measured from the SEM images.

Comparative Preparation Example 1. Preparation of Cobalt-Supported Alumina Catalyst Cobalt-supported alumina particles '10Co(A)' and '10Co(B)' prepared in the same manner as in (1) and (2) of Preparation Example 1 were used as catalysts.

The 10Co(A) catalyst had a specific surface area of 176.0 m$^2$/g, a total pore volume of 0.38 cm$^3$/g and an average pore size of 10.5 nm. And, the 10Co(B) catalyst had a specific surface area of 54.2 m$^2$/g, a total pore volume of 0.20 cm$^3$/g and an average pore size of 19.4 nm.

Comparative Preparation Example 2. Preparation of Core-Shell Cobalt Catalyst by Hydrothermal Synthesis A cobalt catalyst was prepared by immersing a cobalt-supported alumina particle 10Co(A) prepared in the same manner as in (1) and (2) of Preparation Example 1 in a zeolite precursor solution and performing coating by hydrothermal synthesis.

Specifically, a 25 wt % tetrapropylammonium hydroxide solution (TPAOH; 203.37 g/mol, Sigma-Aldrich, Inc.) was used as a template for structure formation. A zeolite solution was prepared using tetraethoxysilane (TEOS), TPAOH, water, ethanol and ammonium nitrate at a molar ratio of 1.10:0.25:60:4:0.028. That is to say, a homogeneous sol solution was prepared by dissolving 70.2 g of a 25 wt % tetrapropylammonium hydroxide solution (TPAOH) in 500 mL of distilled water and then stirring at room temperature for 2 hours. After adding 4.1 g of tetraethoxysilane (TEOS) as a silica precursor, the sol solution was stirred at 80° C. for 3 hours. Hydrothermal reaction was conducted after adding 0.2012 g of aluminum nitrate (Al(NO$_3$)$_3$ 9H$_2$O) as an aluminum precursor dissolved in 184.28 g of ethanol to the reaction solution together with 2 g of the 10Co(A) (1.8 mm)

prepared in (2) of Preparation Example 1. The hydrothermal synthesis was conducted at 155° C. and 2 rpm for 7 days. The prepared particle was washed with distilled water until pH 8, dried at 120° C. for 12 hours and then sintered at 400° C. for 8 hours under an air atmosphere.

The zeolite-coated cobalt catalyst obtained by the hydrothermal synthesis method was denoted as '10 Co(HY)'.

[Examples] Preparation of Hydrocarbon Compounds Through Fischer-Tropsch Synthesis Reaction Examples 1-3 and Comparative Examples 1-2

Hydrocarbon compounds were prepared from a synthesis gas through Fischer-Tropsch synthesis reaction in a fixed-bed continuous reactor under a high-pressure atmosphere using each of the catalysts prepared in Preparation Examples 1-3 and Comparative Preparation Examples 1-2.

The experiment was conducted using an electric furnace equipped with an electric temperature controller, a mass flow controller, a back pressure regulator and a temperature sensor (thermocouple). The temperature sensor was located at the middle of a catalyst layer in the axis direction. A ½-inch long stainless-steel tubular reactor with an outer diameter of 12.7 mm and an inner diameter of 10.2 mm was used. 0.5 g of each catalyst was located at the middle of the reactor and fixed using a quartz wool. Catalyst reduction was conducted at normal pressure and 450° C. for 12 hours while flowing nitrogen and hydrogen at a volume ratio of 5%. After the reduction, the temperature of the reactor was set to 230° C. and reaction was conducted after adjusting the pressure inside the reactor to 25 bar by supplying a reaction gas with a hydrogen to carbon monoxide ratio ($H_2/CO$) of 2. The reaction gas was supplied at different gas hour space velocities (GHSV) of 2000 $h^{-1}$ and 3000 $h^{-1}$.

Gas products from the reaction were analyzed by online gas chromatography (HP7890, Agilent) equipped with a TCD detector, an FID detector, a Carboshpere™ column (80/100) and a GS-GasPro capillary column. Liquid products collected in a product collection cylinder after the reaction were analyzed by offline gas chromatography (HP7890, FID GS Gas-Pro capillary column). From the gas chromatography analysis results, the conversion rate of carbon monoxide in the reaction gas and the selectivity and yield of the products were calculated.

The conversion rate of carbon monoxide in the reaction gas and the selectivity of the products for each catalyst were calculated according to the following equations.

CO conversion rate (%)=[(Moles of CO before reaction)−(Moles of CO remaining after reaction)]/(Moles of CO before reaction)×100    [Equation 1]

Selectivity (%)=(Moles of particular compounds in products)/(Moles of total products)×100    [Equation 2]

$C_2$-$C_4$ olefin selectivity (%)=(Moles of $C_2$-$C_4$ olefins)/(Moles of total $C_2$-$C_4$ products)×100    [Equation 3]

$C_2$+ olefin selectivity (%)=(Moles of $C_2$+ olefins)/(Moles of $C_2$+ n-paraffins)    [Equation 4]

$C_3$+ isoparaffin selectivity (%)=(Moles of $C_3$+ isoparaffins)/(Moles of $C_3$+ n-paraffins)    [Equation 5]

The result of conducting FT synthesis reactions at space velocities (GHSV) of 2000 $h^{-1}$ and 3000 $h^{-1}$ using each catalyst (type A) prepared using the α-alumina particle as the support is summarized in Table 3 and Table 4. And, the result of conducting FT synthesis reactions at space velocities (GHSV) of 2000 $h^{-1}$ and 3000 $h^{-1}$ using each catalyst (type B) prepared using the γ-alumina particle as the support is summarized in Table 5 and Table 6.

TABLE 3

| | | Type A, GHSV 2,000 $h^{-1}$ | | | |
|---|---|---|---|---|---|
| | | Comparative Example 1 10Co(A) | Comparative Example 2 10Co(HY) | Example 1 10Co(A-12H) | Example 2 10Co(A-24H) | Example 3 10Co(A-36H) |
| CO conversion rate (%) | | 28.90 | No Rex. | 31.70 | 31.5 | 30.5 |
| Selectivity (%) | $CH_4$ | 20.84 | — | 19.28 | 22.28 | 20.44 |
| | $C_2$-$C_4$ | 3.70 | — | 5.98 | 4.92 | 3.44 |
| | n-$C_2H_6$ | 0.702 | | 0.941 | 0.811 | 0.705 |
| | =$C_2H_4$ | 0.262 | | 0.129 | 0.139 | 0.165 |
| | ≡$C_2H_2$ | 0.007 | | 0.006 | 0.006 | 0.005 |
| | n-$C_3H_8$ | 0.517 | | 0.989 | 0.618 | 0.466 |
| | =$C_3H_6$ | 1.390 | | 2.177 | 1.476 | 0.954 |
| | n-$C_4H_{10}$ | 0.496 | | 0.443 | 0.525 | 0.342 |
| | i-$C_4H_8$ | 0.333 | | 1.296 | 1.343 | 0.803 |
| | $C_5$+ | 75.44 | — | 74.72 | 72.79 | 76.11 |
| | Total | 100 | — | 100 | 100 | 100 |
| $C_2$-$C_4$ olefin selectivity (%) | | 53.72 | — | 60.31 | 60.27 | 56.02 |
| $C_2$+ olefin selectivity | | 0.032 | — | 0.467 | 0.397 | 0.361 |
| $C_3$+ isoparaffin selectivity | | 0.065 | — | 2.209 | 2.073 | 1.802 |

TABLE 4

| | Type A, GHSV 3,000 h$^{-1}$ | | | | |
|---|---|---|---|---|---|
| | Comparative Example 1 10Co(A) | Comparative Example 2 10Co(HY) | Example 1 10Co(A-12H) | Example 2 10Co(A-24H) | Example 3 10Co(A-36H) |
| CO conversion rate (%) | 48.90 | No Rex. | 51.70 | 51.50 | 50.50 |
| Selectivity (%) CH$_4$ | 20.18 | — | 21.50 | 21.26 | 14.69 |
| C$_2$-C$_4$ | 2.89 | — | 3.60 | 3.62 | 8.041 |
| n-C$_2$H$_6$ | 0.746 | | 0.720 | 0.726 | 1.705 |
| =C$_2$H$_4$ | 0.083 | | 0.090 | 0.087 | 0.485 |
| ≡C$_2$H$_2$ | 0.004 | | 0.004 | 0.005 | 0.015 |
| n-C$_3$H$_8$ | 0.632 | | 0.763 | 0.726 | 1.517 |
| =C$_3$H$_6$ | 0.533 | | 1.084 | 1.035 | 2.174 |
| n-C$_4$H$_{10}$ | 0.454 | | 0.398 | 0.474 | 1.533 |
| i-C$_4$H$_8$ | 0.434 | | 0.548 | 0.566 | 0.610 |
| C$_5$+ | 76.92 | | 74.89 | 75.11 | 77.26 |
| Total | 100 | — | 100 | 100 | 100 |
| C$_2$-C$_4$ olefin selectivity (%) | 36.58 | — | 47.86 | 46.79 | 40.85 |
| C$_2$+ olefin selectivity | 0.024 | — | 0.453 | 0.330 | 0.317 |
| C$_3$+ isoparaffin selectivity | 0.056 | — | 1.849 | 1.490 | 0.939 |

TABLE 5

| | Type B, GHSV 2,000 h$^{-1}$ | | | |
|---|---|---|---|---|
| | Comparative Example 1 10Co(B) | Example 1 10Co(B-12H) | Example 2 10Co(B-24H) | Example 3 10Co(B-36H) |
| CO conversion rate (%) | 44.40 | 49.90 | 53.40 | 46.20 |
| Selectivity (%) CH$_4$ | 17.59 | 22.60 | 20.04 | 19.84 |
| C$_2$-C$_4$ | 1.52 | 5.37 | 6.45 | 3.624 |
| n-C$_2$H$_6$ | 0.358 | 1.144 | 1.347 | 0.705 |
| =C$_2$H$_4$ | 0.082 | 0.260 | 0.300 | 0.183 |
| ≡C$_2$H$_2$ | 0.003 | 0.007 | 0.018 | 0.005 |
| n-C$_3$H$_8$ | 0.332 | 0.718 | 0.865 | 0.498 |
| =C$_3$H$_6$ | 0.370 | 1.365 | 1.730 | 0.996 |
| n-C$_4$H$_{10}$ | 0.272 | 0.552 | 0.628 | 0.427 |
| i-C$_4$H$_8$ | 0.101 | 1.326 | 1.566 | 0.806 |
| C$_5$+ | 80.88 | 72.01 | 73.50 | 76.52 |
| Total | 100 | 100 | 100 | 100 |
| C$_2$-C$_4$ olefin selectivity (%) | 36.66 | 55.06 | 55.99 | 54.99 |
| C$_2$+ olefin selectivity | 0.014 | 0.322 | 0.363 | 0.258 |
| C$_3$+ isoparaffin selectivity | 0.071 | 2.743 | 4.849 | 4.656 |

TABLE 6

| | Type B, GHSV 3,000 h$^{-1}$ | | | |
|---|---|---|---|---|
| | Comparative Example 1 10Co(B) | Example 1 10Co(B-12H) | Example 2 10Co(B-24H) | Example 3 10Co(B-36H) |
| CO conversion rate (%) | 48.10 | 62.10 | 63.50 | 60.80 |
| Selectivity (%) CH$_4$ | 18.76 | 22.59 | 24.60 | 21.03 |
| C$_2$-C$_4$ | 2.64 | 3.58 | 3.94 | 3.36 |
| n-C$_2$H$_6$ | 0.713 | 1.136 | 1.220 | 0.967 |
| =C$_2$H$_4$ | 0.125 | 0.174 | 0.177 | 0.143 |
| ≡C$_2$H$_2$ | 0.005 | 0.012 | 0.012 | 0.011 |
| n-C$_3$H$_8$ | 0.667 | 0.733 | 0.809 | 0.813 |
| =C$_3$H$_6$ | 0.450 | 0.378 | 0.502 | 0.429 |

TABLE 6-continued

| | Type B, GHSV 3,000 h$^{-1}$ | | | |
|---|---|---|---|---|
| | Comparative Example 1 10Co(B) | Example 1 10Co(B-12H) | Example 2 10Co(B-24H) | Example 3 10Co(B-36H) |
| n-C$_4$H$_{10}$ | 0.536 | 0.559 | 0.557 | 0.509 |
| i-C$_4$H$_8$ | 0.142 | 0.589 | 0.662 | 0.492 |
| C$_{5+}$ | 78.59 | 73.82 | 71.45 | 75.65 |
| Total | 100 | 100 | 100 | 100 |
| C$_2$-C$_4$ olefin selectivity (%) | 27.42 | 32.21 | 34.37 | 31.97 |
| C$_2$+ olefin selectivity | 0.021 | 0.317 | 0.342 | 0.252 |
| C$_3$+ isoparaffin selectivity | 0.051 | 1.862 | 1.978 | 1.361 |

From Tables 3-6, it can be seen that the core-shell cobalt catalysts prepared by mechanical alloying process (Preparation Examples 1-3) show increased carbon monoxide conversion rate, C$_2$-C$_4$ light olefin selectivity from C$_2$-C$_4$ products, olefin selectivity from C$_2$+ products and isoparaffin selectivity from C$_3$+ products as the shell thickness increases. It may be because the number of acid sites in the ZSM-5 increases as the shell thickness increases. As the products desorbed from the core part are readsorbed at the acid sites (active sites) of the shell (ZSM-5) part, hydrocracking and isomerization were further conducted.

Also, the olefin and isoparaffin selectivities can be controlled with the space velocity in the FT synthesis reaction. It can be seen that, when the space velocity is 2000 h$^{-1}$, the carbon monoxide conversion rate decreases but the C$_2$-C$_4$ light olefin selectivity from C$_2$-C$_4$ products, the olefin selectivity from C$_2$+ products and isoparaffin selectivity from C$_3$+ products increase as compared to when the space velocity is 3000 h$^{-1}$. It may be because as the residence time of the long chain paraffins produced at the core part on the acid sites of the shell, hydrocracking and isomerization were conducted enough.

In addition, the zeolite coating thickness varies depending on the crystal phase of the alumina particle even under the same mechanical alloying condition. From Tables 3-6, it can be seen that the cobalt catalysts prepared using the α-alumina as the support have thicker shells than the catalysts prepared using the γ-alumina as the support. This result can be explained with charge transfer between the adsorbed metal and the alumina surface during the mechanical alloying process. Because the α-alumina which has more Lewis acid sites than the γ-alumina acts as a better electron pair acceptor, the charge transfer occurs better and a relatively thicker shell is formed.

The catalyst of Comparative Preparation Example 2 on which zeolite was coated using the existing hydrothermal synthesis method had a relatively small average shell thickness of about 30 μm despite the long coating time of 7 days and showed no activity when used in the FT synthesis reaction. Because the Al (core)-O-Si (shell) bonding between the core and the shell is not formed easily with the hydrothermal synthesis method, the reaction should be conducted for a long time at low stirring rate under a harsh hydrothermal synthesis condition. It is thought that the strongly basic tetrapropylammonium hydroxide (TPAOH, pH 13) contained in the zeolite solution is infiltrated into the core part during this process and deactivates the catalyst by dissolving the cobalt active metal. Also, it is thought that the alumina precursor or the silica precursor used in the hydrothermal synthesis may infiltrate into the pores of the core through pressure-driven capillary action and form zeolite crystals there, thereby blocking the pores of the core and deactivating the cobalt active metal. That is to say, to coat zeolite on the surface of the sintered alumina particle by the existing hydrothermal synthesis method is problematic in that a long reaction time as long as 7 days is necessary to form the Si-O-Al bonding, the shell coating thickness is limited and, most importantly, the zeolite precursor may infiltrate into the pores of the core and block the pores or deactivate cobalt.

What is claimed is:

1. A core-shell cobalt catalyst for a Fischer-Tropsch synthesis reaction, which comprises
   a core composed of a spherical, cobalt-supported and sintered alumina particle having a diameter of 1-5 mm;
   a shell composed of a zeolite powder having a SiO2/Al2O3 molar ratio of 5-40 coated on the surface of the core to a thickness of 50-300 μm through a mechanical alloying process; and
   a bimodal porous structure with the core having mesopores with an average pore size of 10.5-21.1 nm and a pore volume of 0.18-0.37 cm$^3$/g, and the shell having micropores with an average pore size of 0.6-0.82 nm and with a pore volume of 0.057-0.116 cm$^3$/g.

2. The core-shell cobalt catalyst for a Fischer-Tropsch synthesis reaction according to claim 1, wherein the alumina particle constituting the core is an α- or γ-alumina particle.

3. The core-shell cobalt catalyst for a Fischer-Tropsch synthesis reaction according to claim 1, wherein the zeolite powder coated through the mechanical alloying process is ZSM-5 zeolite.

4. A core-shell cobalt catalyst for a Fischer-Tropsch synthesis reaction, which comprises:
   a spherical, cobalt-supported and sintered alumina particle having a diameter of 1-5 mm as a core;
   a zeolite powder having a SiO2/Al2O3 molar ratio of 5-40 coated on the surface of the core to a thickness of 50-300 μm through a mechanical alloying process as a shell; and
   a bimodal porous structure with the core having mesopores with an average pore size of 10.5-21.1 nm and the shell having micropores with an average pore size of 0.6-0.82 nm.

5. The core-shell cobalt catalyst for a Fischer-Tropsch synthesis reaction according to claim 4, wherein the core comprises a cobalt active metal infiltrated in the core at an amount of 2-20 wt % with respect to the amount of alumina support in the core.

6. The core-shell cobalt catalyst for a Fischer-Tropsch synthesis reaction according to claim 4, wherein the core comprises a cobalt active metal infiltrated in the core at an amount of 5-10 wt % with respect to the amount of alumina support in the core.

7. The core-shell cobalt catalyst for a Fischer-Tropsch synthesis reaction according to claim 4, wherein core having mesopores with a pore volume of 0.18-0.37 cm$^3$/g.

8. The core-shell cobalt catalyst for a Fischer-Tropsch synthesis reaction according to claim 4, wherein shell having micropores with a pore volume of 0.057-0.116 cm$^3$/g.

9. The core-shell cobalt catalyst for a Fischer-Tropsch synthesis reaction according to claim 4, wherein core having a specific surface area of 47-163 m$^2$/g.

10. The core-shell cobalt catalyst for a Fischer-Tropsch synthesis reaction according to claim 4, wherein shell having a specific surface area of 173-251 m$^2$/g.

11. A core-shell cobalt catalyst for a Fischer-Tropsch synthesis reaction, which comprises a core composed of a spherical cobalt-supported sintered alumina particle;

a shell from zeolite powder having a SiO2/Al2O3 molar ratio of 5-40 coated on the surface of the core to a thickness of 50-300 μm; and a bimodal porous structure with the core having mesopores with an average pore size of 10.5-21.1 nm and the core having a specific surface area of 47-163 m$^2$/g, and the shell having micropores with an average pore size of 0.6-0.82 nm and the shell having a specific surface area of 173-251 m$^2$/g.

12. The core-shell cobalt catalyst for a Fischer-Tropsch synthesis reaction according to claim 11, wherein the zeolite powder is ZSM-5 zeolite.

13. The core-shell cobalt catalyst for a Fischer-Tropsch synthesis reaction according to claim 11, wherein the alumina particle of the core is an α- or γ-alumina particle.

14. The core-shell cobalt catalyst for a Fischer-Tropsch synthesis reaction according to claim 11 wherein the zeolite powder has a SiO2/Al2O3 molar ratio of 5-40 and is coated on the surface of the core to a thickness of 50-300 μm through a mechanical alloying process.

* * * * *